UNITED STATES PATENT OFFICE.

J. T. ALDEN, OF CINCINNATI, OHIO.

IMPROVEMENT IN THE PREPARATION OF YEAST.

Specification forming part of Letters Patent No. 40,451, dated November 3, 1863; antedated October 20, 1863.

*To all whom it may concern:*

Be it known that I, J. T. ALDEN, of Cincinnati, in the county of Hamilton and State of Ohio, have invented a new and useful Improvement in the Manufacture or Preparation of Yeast; and I do hereby declare the following to be a full, clear, and exact description of the same.

The manufactured commodity to which my invention relates I term "granulated yeast;" and my improvement consists in reducing concentrated yeast while in a plastic or semi-fluid state to small molecules or grains, in which finely-divided state the substance is very speedily deprived of water, thereby causing it to retain its peculiar properties unimpared in the process of drying and in a convenient form for preservation and future use.

To enable others of competent skill to make my improved granulated yeast, I will now proceed to describe my process of making or preparing it. I will, however, first remark that portable yeast made in the form of cakes and in that form dried and preserved is well-known. In some cases the yeast, after being dried, has been reduced by crushing or grinding to a coarse powder, and in that state has been termed "granulated yeast;" but the process by which this is made, and the yeast itself, when prepared by any of the modes heretofore known, is essentially different from that which I am about to describe.

It is well understood that yeast is an organized substance, consisting of minute sacks or cells feebly joined together, each series of cells being termed a "yeast-plant." These plants or series of cells develop or are propagated under favorable circumstances very rapidly. The structure of the yeast-plant is extremely delicate and liable to be injured or destroyed, thus destroying the active or useful property of the yeast.

"Mechanical injury kills or destroys yeast. Falls, bruises, or rough handling spoils it, so that great care is required to remove it from place to place."—*Youmans*.

"Simple pressure diminishes the power of yeast to excite the vinous fermentation."—*Liebeg*.

It will thus appear that subjecting the yeast to a crushing or grinding process while in a dry state must impair, if not wholly destroy, its useful qualities. While the yeast-plants are contained in the fluid in which they were developed they are not liable to any mechanical injury; but unless removed from the fluid and deprived of moisture they tend to pass into the acetic or a putrescent state, and thus be destroyed.

The useful quality of yeast is greatest at that point in its development when the plants, being multiplied to the greatest possible number, still retain the vital principle in a vigorous and active state. If after this the yeast be allowed to remain in the fluid, or even in a damp state, it speedily deteriorates, and shortly sours and is lost; but if immediately deprived of moisture, without any injury to the organized structure of the plants, all the active properties of the yeast are retained, and will remain unimpaired for an indefinite period.

When yeast is dried in the form of cakes of considerable thickness it is necessary to provide for the fermentation which continues to take place during the process of drying, and as this is protracted, owing to the mass in which the yeast is contained, it is quite impracticable to secure any reasonable degree of uniformity in the results. If the yeast is very active, it is liable to sour and become worthless; to avoid which it is necessary to reduce the yeast by a large addition of meal or other substance, thus greatly diminishing the proportion of active yeast in the mass.

By my process, which I shall now describe, it will be seen that the yeast is allowed to remain in the fluid state and developed to its highest point, and when attained to that state is instantaneously arrested and dried and placed beyond the risk of further change.

My granulated yeast is made in the following manner. Take one hundred (100) pounds crushed barley malt and steep in fifty (50) gallons water at a temperature of 140° or 150° Fahrenheit for one and one-half hour. Then draw off the liquor and add thirty gallons more water to the malt, which maintain at a temperature of 170° to 200° one hour. Then draw off, and, having added the last to the first liquor, with three-fourths of a pound of hops, boil the whole until the saccharometer indicates 10°. Then strain, and the liquor is ready for use. To each gallon of the above liquor, at the boiling-temperature add two and one-half pounds red-wheat flour, thoroughly mixing the latter until free of lumps, and when reduced by cooling to the temperature of 130°, add one and one-fourth pound of pea or bean flour for each gallon of the liquid. When further reduced by cooling to 85°, add to the mass fresh yeast in the proportion of one-half pint of the latter to one gallon of the mixture, and maintain the temperature at 85° for forty-eight hours. At this time the development of the yeast-plants will have been consummated, and the process should be immediately arrested. To accomplish this add to the yeast finely-ground white cornmeal or "millers' shorts" until the substance acquires the consistency of soft dough. The mass is then pressed through the meshes of a No. 6 wire-cloth sieve, by which means the plastic substance is formed into numerous threads about one-eighth of an inch square, which fall and distribute themselves upon suitable frames below, which frames are immediately removed and placed in a position to expose the finely-divided substance or granules to a current of warm dry air. The moisture is thus very speedily evaporated from the yeast, and the fermenting process completely suspended.

It will be apparent that the yeast, when reduced to fine threads or granules, as stated, having a large amount of surface exposed to the warm dry air, is most rapidly and effectually deprived of moisture, and that no considerable amount of fermentation or change can take place from the time the first steps in the process of arresting fermentation are commenced until the yeast is dried and rendered secure. It will also appear that the yeast, when dried in this finely-divided or granulated state, is presented in the most convenient form for being subsequently dissolved for use, and that no injurious grinding or crushing process has been necessary to prepare it for use.

Having thus fully described my invention, I desire to disclaim all the processes of making yeast in which the substance is first formed into cakes and then dried, or in which, after being died, the yeast is reduced by crushing or grinding to a finely-divided or granulated state; but

What I claim as my invention, and desire to secure by Letters Patent, is as follows:

The process herein described of making or preparing granulated yeast, wherein the substance is reduced while in a plastic condition to a finely-divided or granulated state, and in that form is dried and preserved for use, substantially as set forth.

JOHN T. ALDEN.

Witnesses:
  WM. E. JONES,
  HARRIET T. ALDEN.